United States Patent [19]

Michel et al.

[11] Patent Number: 5,268,666
[45] Date of Patent: Dec. 7, 1993

[54] APPLIANCE CONTROL SYSTEM PROVIDING OUT-OF-CONTEXT USAGE

[75] Inventors: Alan D. Michel, Fishers; Randal D. Wood, New Palestine, both of Ind.

[73] Assignee: AT&T Bell Laboratories, Murray Hill, N.J.

[21] Appl. No.: 812,447

[22] Filed: Dec. 23, 1991

[51] Int. Cl.$^5$ .................. H04B 3/00; H04L 27/00
[52] U.S. Cl. ........................ 340/310 R; 340/310 A; 340/310 CP; 379/66
[58] Field of Search ........ 340/310 R, 310 A, 310 CP, 340/825.06, 825.54, 825.07; 375/36, 37; 379/37, 66

[56] References Cited

U.S. PATENT DOCUMENTS

| | | | |
|---|---|---|---|
| 3,555,393 | 1/1971 | Williams | 318/673 |
| 4,081,840 | 3/1978 | Kolm | 358/194 |
| 4,152,696 | 5/1979 | Smith | 340/172 |
| 4,349,701 | 9/1982 | Snopko | 179/2 |
| 4,386,436 | 5/1983 | Kocher et al. | 455/151 |
| 4,418,333 | 11/1983 | Schwarzbach et al. | 340/310 |
| 4,446,458 | 5/1984 | Cook | 340/310 CP |
| 4,456,925 | 6/1984 | Skerlos et al. | 358/85 |
| 4,695,739 | 9/1987 | Pierce | 307/141 |
| 4,807,225 | 2/1989 | Fitch | 370/71 |
| 5,003,457 | 3/1991 | Ikei et al. | 340/310 A |

OTHER PUBLICATIONS

CEBus: A New Standard in Home Automation, Ken Davidson Aug./Sep., 1989—Issue 10 of Circuit Cellar Inc.

Primary Examiner—Donnie L. Crosland
Attorney, Agent, or Firm—Michael A. Morra

[57] ABSTRACT

A controller that includes a number of switches is associated with a first appliance that has a number of operating states. In at least one of the operating states of the first appliance, the controller responds to certain switch actuations by causing it to perform a task; but when it is in another operating state, the same switch actuations have no meaning insofar as the first appliance is concerned, so the controller responds by transmitting data signals to a second appliance to have it perform a similar task. In this manner, a single controller can be used to control a number of appliances when a particular switch actuation has no meaning in the context of controlling the associated appliance. In an illustrative embodiment of the invention, the keypad of a telephone set is used to select a particular television station. Control signals are sent by the telephone to the television by spread spectrum data transmission over an AC power line. The data transmission format used is in accordance with the CE-BUS ® standard promulgated by the Electronic Industries Association.

15 Claims, 8 Drawing Sheets

APPLIANCE CONTROL SYSTEM PROVIDING OUT-OF-CONTEXT USAGE

TECHNICAL FIELD

This invention relates to apparatus for controlling an appliance, and more particularly to an apparatus for controlling a plurality of different appliances.

BACKGROUND OF THE INVENTION

The growth in consumer electronic appliances, of recent years, has led to a corresponding growth in devices for controlling such appliances. Controls are not only located on the appliances themselves, but also on remote units associated with the appliance. It would not be surprising to find more than a dozen control devices within the same house—each one operating in a slightly different manner, and each one having switches numbered 0 through 9. Indeed, one might even be inclined to speculate that the urge among humans to control distant objects by operating switches numbered 0 through 9 is a distinguishing characteristic of our species. Nevertheless, the proliferation of control devices continues at an accelerated pace; and so it is desirable to minimize the need for additional control devices, and to make future control devices more flexible.

In known systems where it is desired to selectively control a number of different appliances, it has been necessary to provide a separate control device for each appliances. Each of the appliances receives control signals over a direct link—at least one wire for each function being controlled. This proliferation of wires is remedied by U.S. Pat. No. 4,152,696 which teaches how a multifunction appliance can be controlled by transmitting different DC voltages. A simple, voltage-sensing circuit at the appliance would then activate a particular control line in accordance with the particular DC voltage transmitted. This technique decreases the number of wires needed for controlling a multifunction appliance without complex message signaling; but still requires separate wiring between the control device and the appliance which ties the control device to a fixed location. Further, a specialized control device is generally costly and becomes obsolete, or redundant, when the need arises to control additional appliances.

A system that combines a television receiver with a telephone interface is shown in U.S. Pat. Nos. 4,349,701 and 4,456,925. These patents disclose a 2-way telephone communication system which operates through a television receiver. The television receiver is interconnected with a telephone line and functions as a speakerphone. The user is provided with a remote control device which operates the television receiver and enables telephone calls to be answered or initiated. The switches on the remote control device are used to select a particular television channel or to dial a telephone number depending on which specifically defined task is selected.

A number of manufacturers even offer remote control devices that are capable of controlling a large number of appliances including television sets, compact disc players, stereo receivers and video cassette recorders (VCRs). Such control devices use infra-red light to transmit their control signals and offer the advantage that individual wires are not needed. Portability is achieved by eliminating hard-wire connections, but users don't understand how to operate more than a few control functions. Indeed, modern consumers now have so many bewildering conveniences at their fingertips that they are unable to use any of them.

Accordingly, there is a "long-felt" need to control a number of appliances from different locations within the home, and in a manner that the consumer can readily understand. Further, it is desirable for different control devices to operate in substantially the same manner. And finally, the ability to add remotely controlled appliances to a household, without a corresponding addition of remote control devices, would be most welcome.

SUMMARY OF THE INVENTION

In accordance with the invention, control apparatus is associated with a first appliance for the purpose of changing its operating state when one or more switches are actuated. Certain switch actuations cause the first appliance to perform a task when it is in a first operating state, but not when it is in a second operating state. In the second operating state, the control device responds to the certain switch actuations by transmitting a signal to a second appliance for the purpose of changing the operating state of the second appliance. In this manner, a single control device can be used to control a second appliance when a particular switch operation has no meaning in the context of controlling the first appliance.

In the illustrative embodiment of the invention, appliances share a common AC power line and are controlled by signals transmitted over the power line. The data transmission format used is in accordance with the CEBUS® standard promulgated by the electronic Industries Association.

In one illustrative embodiment, a telephone set is used to generate signals for remotely controlling the selection of a particular radio station. Buttons (keypad switches) that are normally used for dialing a telephone number may be operated while the telephone is in its idle condition; such button operations are interpreted as commands for changing an FM radio station—assuming that the FM radio is already on. The particular task performed as a result of actuating one or more buttons on the surface of the telephone is either carried out by the telephone itself, or a contextually similar task is carried out by another appliance within a predetermined grouping of appliances. One example of a contextually similar task is increasing the loudness (sound volume) of an appliance within the group by actuating the receiver loudness control on the telephone set. Naturally, this task would only be performed on an appliance, other than the telephone, when that task could not be performed on the telephone (perhaps because it is in an idle state).

In another illustrative embodiment of the invention, a center-rest switch is used for controlling lights, television sets and stereos within the room.

BRIEF DESCRIPTION OF THE DRAWING

The invention and its mode of operation will be more clearly understood from the following detailed description when read with the appended drawing in which.

DETAILED DESCRIPTION

Overview

Figure 1:
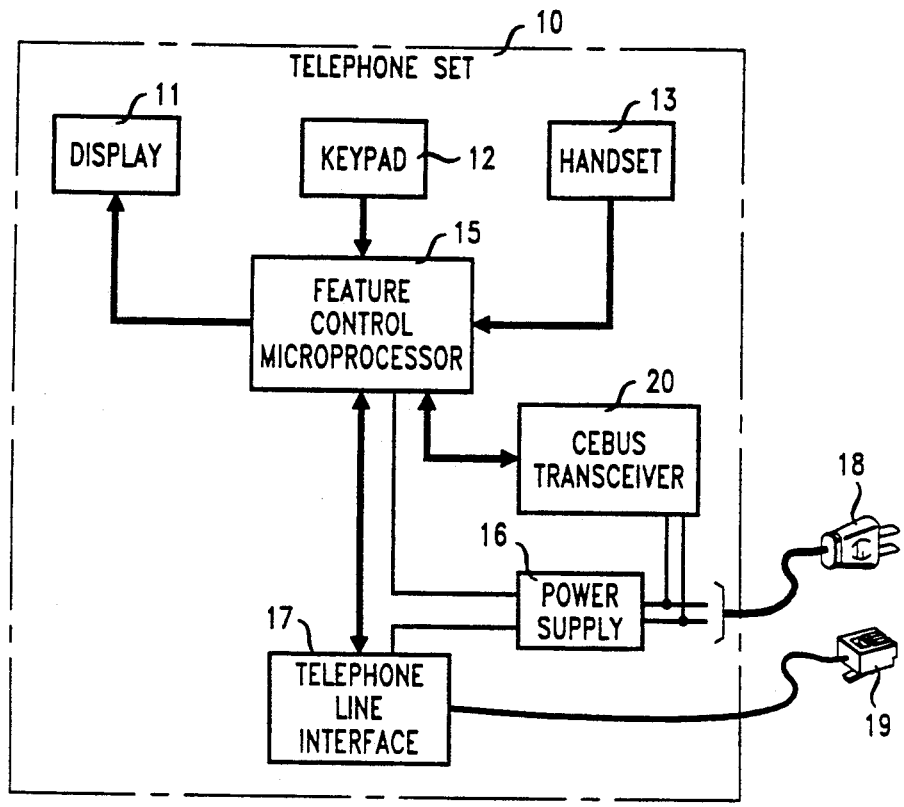
FIG. 1 discloses a block diagram of a telephone set in accordance with the present invention.

In consumer appliances today, each appliance acts as a self-contained, closed system. However from the user's point of view many appliances have similarities in both appearance and function. For example, the control buttons (keys) on a telephone set are similar to those on a television (TV) remote controller. In this example, the present invention takes advantage of this similarity by allowing the telephone keypad to be used to increase the sound volume of the TV when the telephone is on-hook and when the operation of its loudness control button is "out of context" with regard to the present state of the telephone. Further, if the TV is OFF then, perhaps, the sound volume of the FM radio would be increased because that might be the only action that makes sense in these circumstances. The current practice of user interface design for handling actions by the user that are "out of context" for the particular state of a device is to discard them. This is because each device is a separate, closed system. However, to the user, the action may make sense in the context of controlling some other device within the same room.

If the user is watching TV while sitting next to the phone, to change the TV volume the user is generally required to use the volume control on the TV or its associated remote controller. However, the telephone volume control may be the most convenient volume control within reach of the user. Because the telephone is in the on-hook (idle) state, pressing one of the volume control buttons (i.e., receiver loudness) is "out of context" for the idle state of the telephone. However, instead of ignoring the volume control change, circuitry within the telephone re-routes the user's intent to change the volume of the TV. From the point of view of the user, any volume control can be used to change the volume of any device they happen to be listening to at the time. If both the TV and the telephone are active, then pressing the volume control on the telephone would change its volume, as would be expected. Similarly, if the telephone is active and the TV is off, then the user can increase the volume of the telephone by pressing the "volume up" button on the TV's remote controller. This volume control action is out of context for a TV that is off, but makes sense, from the user's point of view, in the context of controlling a telephone in the active state.

Even a light switch can effectively participate in this form of user interface. A center-rest switch is pressed upward to generate an "on" command and downward to generate the "off" command. However, the switch would not remain in the up or down position after pressure was released, but would return to an intermediate position. If the lights in the room are already OFF, then the light switch would route any "off" command to other devices in the room; so that when the user leaves the room and wants to turn everything off, additional "off" commands from the lihht switch would be interpreted as commands to turn off other devices within the room. Accordingly, the above-described home automation system requires that each of the appliances have access to command information.

Distributing electrical information within a home or business premises is a concern that has received much attention due to the enormous growth of consumer electronics products such as personal computers, security systems and home entertainment equipment. The Electronic Industries Association (EIA) has proposed an evolving standard for the electronic industries to promote compatibility of electronic products. Products that are compatible with this standard are known as known as CEBUS (Consumer Electronics Bus) products. Its intention, once complete, is to allow a unified method of communication between virtually any electronic device found in a typical home. Ideally, any CEBUS product will be able to communicate with any other CEBUS product regardless of who makes it. Each product includes its own application software that determines the kind of information that it will transmit, and the kind of information it will receive. Such application software gives each product its own unique "personality."

Telephone Set Embodiment (I)

Many of today's telephone sets already include a microprocessor, particularly when they provide such features as telephone number storage or an information display area. Implementation of the present invention in such a telephone is a relatively easy task and is generally disclosed in the drawing of FIG. 1. Central to telephone set 10 is feature control microprocessor 15 which controls virtually all of its operations in accordance with a program permanently stored in its associated memory. Indeed, practically all modern electronic equipment includes special purpose hardware controlled by software—a microprocessor being the interface between the hardware and software. In this respect, the present invention is no exception. Microprocessor 15 is responsive to user operated switches such as keypad 12 which the customer uses to input his commands, and handset 13 which generally rests on a spring-loaded switchhook for selecting between the idle (on-hook) state and the off-hook state of telephone set 10. A suitable microprocessor is the NEC V25, 8-bit microcomputer which is commercially available.

Figure 8:
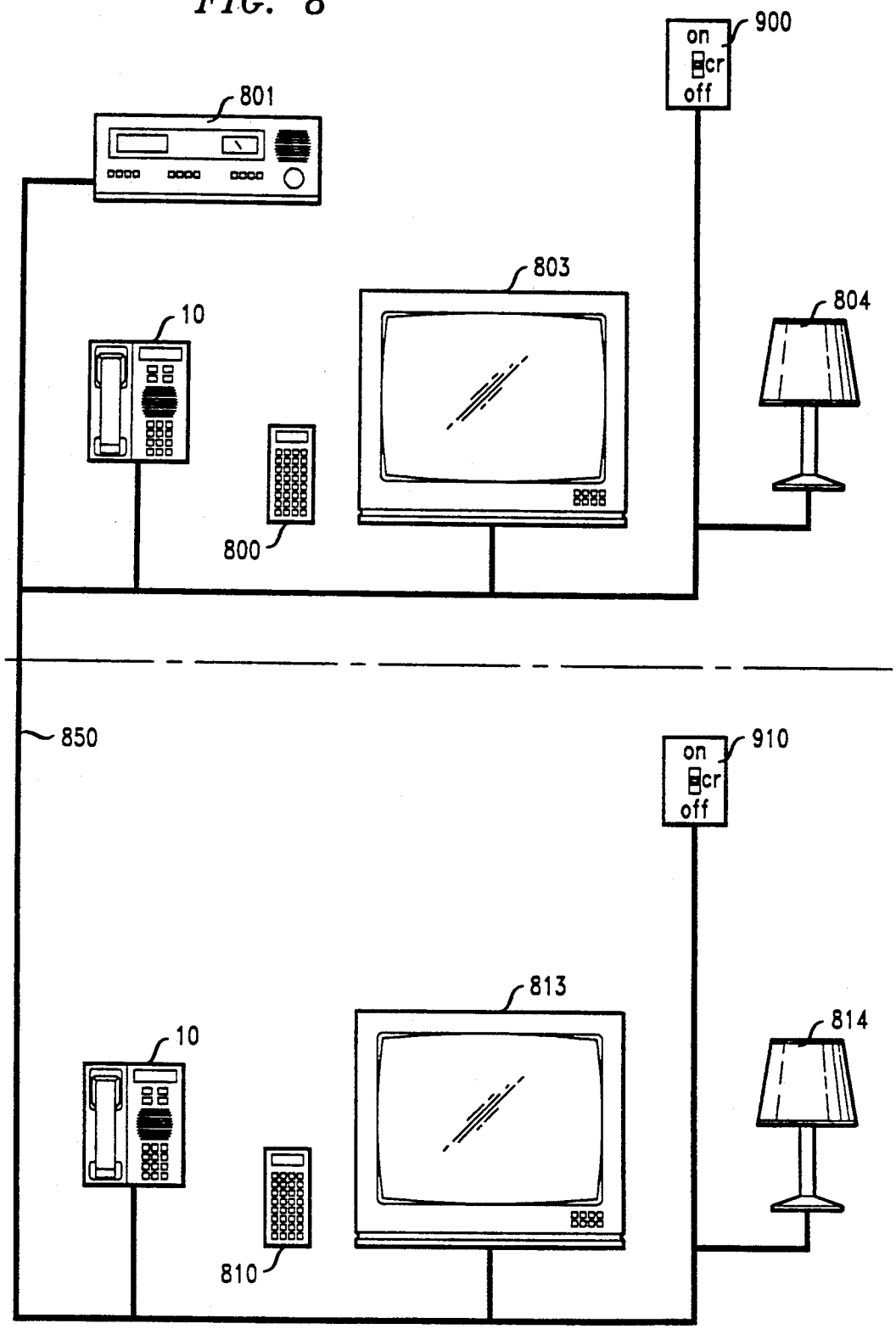
FIG. 8 discloses various consumer electronic products, in two different rooms, that are connected to the same power line media.

Telephone line interface 17 connects to a standard telephone line through modular plug 19 and includes circuitry that terminates the telephone line, detects ringing, and generates DTMF (touch tone) signals to the telephone line in response to commands from microprocessor 15. These are well known functions and the circuitry for carrying them out is commercially available from a number of suppliers. Further, power supply 16 converts commercial 115 VAC power into one or more DC voltage sources for use within the telephone set. Of greater significance to the present invention is CEBUS transceiver 20 which transmits and receives data between telephone set 10 and the 115 VAC power line that is connected to the telephone set via power cord 18. Notwithstanding the hostile environment that the power line offers data transmission, the preferred embodiment of the invention uses the power line because it is already available and connected to virtually all appliances within the home. FIG. 8 shows telephones 10, each in a different room, that are connected to power line 850 along with a plurality of other CEBUS appliances. FIG. 8 will be discussed in greater detail below, but illustrates an environment suitable for telephones designed in accordance with the invention.

Figure 2:
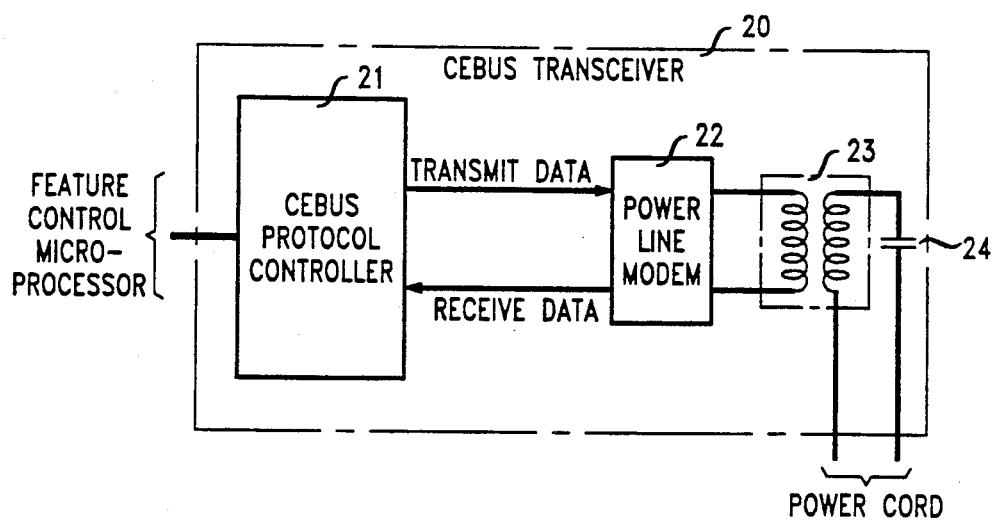
FIG. 2 discloses a block diagram of a transceiver for transmitting and receiving data over a power line.

CEBUS transceiver 20 is shown in greater detail in FIG. 2 and includes a pair of integrated circuits (ICs) for interfacing an application station, such as a telephone set, with a power line in accordance with EIA IS-60 (discussed below). Acceptable ICs are commercially available from Intellon Corporation, Texas Instruments, and CyberL YNX Computer Products. CEBUS Protocol Controller 21 is an integrated circuit that exchanges (transmits/receives) information at the Application Layer (of the ISO/OSI seven-layer network model) with the Feature Control Microprocessor, and at the Data Link Layer with Power Line Modem 22. The Power Line Modem comprises a modulator and a demodulator. The modulator converts binary data signals into spread spectrum signals (swept from 100 kHz to 400 kHz) as discussed below in connection with FIG. 4, whereas the demodulator performs the reverse process. Transformer 23 couples the spread spectrum signals to the power line and blocking capacitor 24 keeps the 60 Hz AC power line signal from flowing through the transformer. The magnitude of the capacitor is selected to be large enough to pass signals at 100 kHz, but small enough to block signals at 60 Hz. It is clear that although CEBUS transceiver 20 is adapted to couple signals to/from a power line, other media such as a Twisted Pair or an Infra-Red (IR) link are possible. In those case, different transceivers would need to be used. An alternate technique for use by telephone sets that are not located near power receptacles comprises the transmission of data onto the telephone line in accordance with EIA IS-60 for a Twisted Pair bus in combination with a router that transfers such data onto the power line. The router would be located wherever a telephone jack and a power receptacle are in close proximity. Before discussing the design of telephone set 10 in greater detail, however, the communications protocol is considered because it introduces concepts that facilitate understanding of the invention and provides an infrastructure for its implementation.

Consumer Electronics Bus

The Consumer Electronics Bus is the subject of EIA Interim Standard 60 (EIA IS-60) which is a somewhat lengthy document that sets forth the technical requirements for compatibility among electronic products in a home automation application. The CEBUS standard is modeled after the ISO/OSI seven-layer network definition. At the top is the Application Layer, where CAL (Common Application Language) is used to command other electronic products to perform certain desired actions. At the lowest level is the Physical Layer where the actual signaling techniques reside which are different for each medium. CEBUS devices communicate over one or more physical media, including Power Line, Twisted Pair, IR, Radio Frequency (RF), Coaxial Cable, and (eventually) Fiber Optic cable. Routers are used to communicate messages from one medium to another. Signaling is done on most of the media by switching between a "superior" state and an "inferior" state. Times between changes determine the information being conveyed. Although the preferred embodiment of the present invention is disclosed in terms of the power line medium, it is understood that the particular medium chosen can be changed without departing from the teaching of the invention.

The power line will likely be the most used transmission medium for CEBUS products because it is already in place in all homes. Nevertheless, the power line is the most hostile medium for data transmission because of impulse noise from existing appliances and data transmission from control systems that already use the power line. One such system is shown in U.S. Pat. No. 4,418,333 which discloses an appliance control system. In this system, messages are transmitted by pulse-width modulation in which various length carrier bursts are used to represent different logic levels and synchronization pulses. Each bit of a message is synchronized to the positive-going zero-crossings of the 60 Hz AC line voltage. The carrier signal comprises a 5 to 6 volts peak-to-peak signal at 150 kHz which is transmitted only at the 60 Hz zero-crossing. For this reason, spread-spectrum signaling is presently planned as the CEBUS standard for transmission over power lines.

Figure 3:
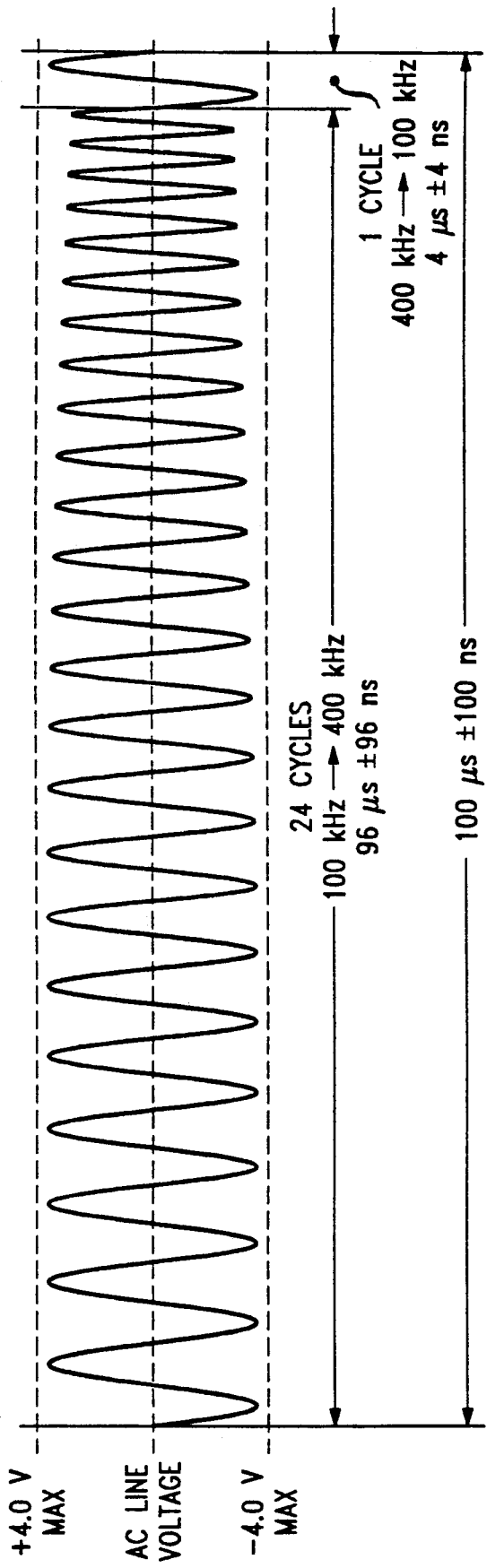
FIG. 3 shows a waveform over a single symbol interval that is suitable for spread-spectrum transmission of data over the power line.
Figure 4:
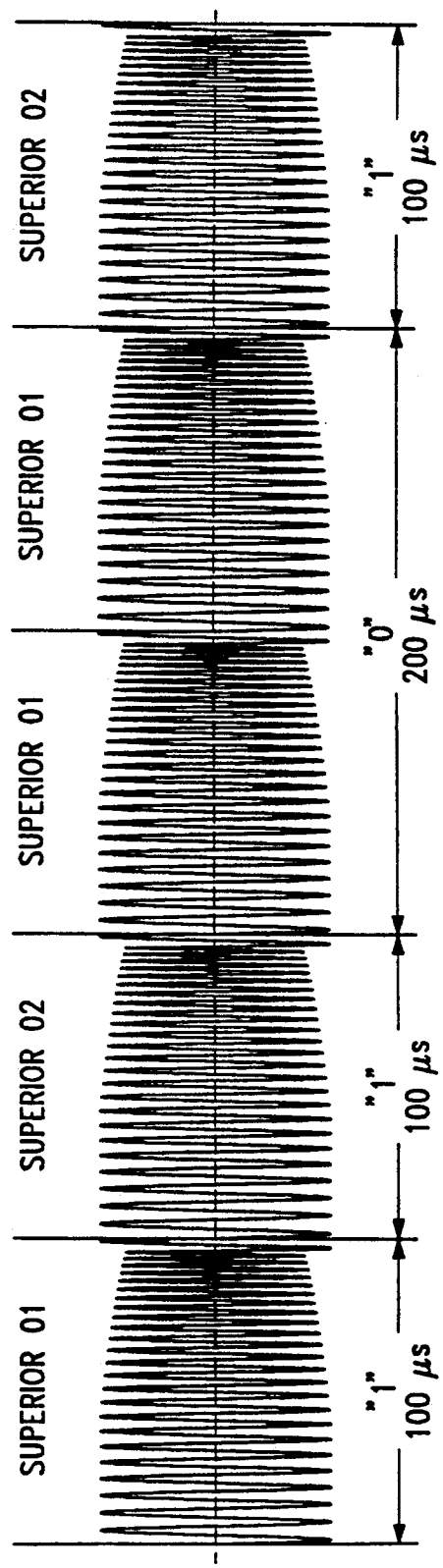
FIG. 4 illustrates a time sequence of symbols, such as shown in FIG. 3, for transmitting binary data message "1101"

FIG. 3 discloses a waveform which represents the anticipated CEBUS standard for power line transmission. Note that the carrier signal is swept from 100 kHz to 400 kHz in twenty-four cycles over a 100-microsecond Unit Standard Time (UST) interval. At the end of this period, the carrier signal is returned to 100 kHz in one cycle over a 4-microsecond time interval. Further, the amplitude of the carrier decreases during each UST as the carrier frequency increases in order to reduce radio-frequency noise. This waveform adds to the AC line voltage and comprises 24 cycles of carrier frequency per UST. Two superior states are defined for the power line media (superior 01, superior 02) which comprise the same swept carrier signal as shown in FIG. 3, but are 180 degrees out of phase with each other. Reference is now made to FIG. 4 which illustrates the waveform that results from a binary data signal "1101." A logical "1" is transmitted by remaining in one superior state for only one UST interval before changing to the other superior state, and a logical "0" is transmitted by remaining in one superior state for 2 UST intervals before changing to the other superior state.

Figure 5:
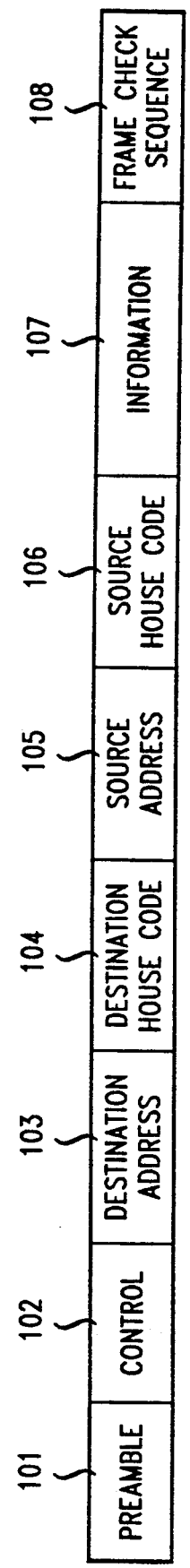
FIG. 5 discloses the organization of an information packet in accordance with the CEBUS standard.

Although details regarding the Physical Layer have been provided, is is also useful to provide certain details regarding the Data Link Layer of the ISO/OSI seven-layer network model for the CEBUS standard. In particular, FIG. 5 discloses the organization of information within a data packet of the CEBUS standard. The illustrated data packet includes eight (8) fields of information as described below:

(i) Preamble field 101 comprises an 8-bit random number used for preventing collisions between competing transmission sources. Collision prevention, detection, and resolution is handled using Carrier Sense, Multiple Access with Collision Detection and Collision Resolution (CSMA/CDCR). In a sense, the preamble field is a sacrificial lamb, used to detect the presence of another message that may have started simultaneously from another source. If the transmitting node receives an exact copy of what it transmits, then there is no collision. If at some point, during an inferior state, it receives a superior state, there is simultaneous transmission and the device in the inferior state ceases transmission and waits until the other device has finished (plus a set amount of time determined by priority, etc.). The network must be silent for a time interval (in the inferior state) before a transmission by any device can begin. Using this method, most collisions do not result in a loss of information, and most collisions are detected by one party or the other during the preamble field.

(ii) Control field 102 comprises a maximum of 8 bits which determines service class (basic or extended), privilege (nonprivileged or privileged), priority (deferred, high or low), and packet type (local data unacknowledged, local data acknowledged, acknowledged response, nonlocal data unacknowledged, nonlocal data acknowledged, and failure response). This field is also referred to as the Logical Link Control Protocol Data Unit.

(iii) Destination Address 103, Destination House Code 104, Source Address 105, and Source House Code 106 fields each comprise a maximum of 16 bits that define the destination and source of the data packet. The house code is recommended to be 16 bits in length to identify the house where each appliance belongs. This is especially important on media, such as RF or Power Line Carrier that may actually include several houses. Each appliance has its own unique address and house code which is required to allow communication between appliances. For example, when multiple CEBUS television sets are connected to the same Bus and one of them sends a request to the VCR to start playing a tape, the VCR must know which TV to instruct to change to channel 3 (or channel 4).

(iv) Information field 107 comprises a maximum of 32 bytes that comes from the higher network levels (NPDU, APDU, CAL) to determine which media (Power Line, Radio Frequency, Twisted Pair, etc.) are to receive copies of the packet; and the command to be executed by the destination appliance(s) as well as the protocol of information exchange (e.g., synchronous or asynchronous and what kind of response is desired in the case of an explicit command). The EIA has prepared tables of predefined contexts to create commands to perform virtually any desired function. Further, the EIA has defined a Common Application Language (CAL) that allows appliances to communicate intelligently with each other.

NPDU stands for Network Protocol Data Unit which indicates how the information is to be routed. The first bit is used for privileged/unprivileged transmission. The next two bits determine the routing a packet may take in getting to the destination. Possibilities include flood routing, directory route, an ID packet, or a return ID packet. Flood routing means transmit on every available media. Directory route means for routers to only forward information to the media necessary to get the message to the required destination. ID packet and return ID packet are special packets that can be transmitted by an application upon request and are used to set up the directory tables in routers between media. A description of their usage is found in the "Node Network Layer" section of the CEBUS draft interim standard. The next bit has been reserved for future use and is set to a logical "1." The next bit indicates other forms of an NPDU besides the standard basic form. It is called the "Extended Services Flag." If it is set, then there are additional bytes of information in the NPDU that handle such details as flow control, transmission of number packets, etc. The next bit is the "Allowed Media Bit" which, if it is "1" there will be a following byte in which each bit indicates an allowed media in which the message may be transmitted. These are, in order, IR, RF, Audio Video Cluster, Fiber Optic, Coaxial, Twisted Pair, and Power Line. The next two bits, designated BR2 and BR1, indicate the presence of router address(es) in following bytes that will be used if the packet must go from a wireless media (IR and RF) to a wired media and then, optionally, back to a wireless media for from a wired to a wireless media to reach the destination.

APDU stands for Application Protocol Data Unit which, like the NPDU can take various forms depending upon the information in the first byte. The first two bits of the first byte indicate the mode. Modes are Basic Fixed Length (BF), Basic Variable Length (BV), Privileged Fixed Length (PF), and Privileged Variable Length (PV). Most messages will make use of the Basic fixed format of the APDU. In the BF APDU, the mode bits are set to "11." The next three bits in the BF APDU are the APDU type which are Explicit Invoke, Implicit Invoke, Result Initiated, Result Completed, Reject, and Error. Explicit Invoke means that the receiver of the packet needs to transmit a packet(s) back to the sender with the results of the CAL command. Implicit Invoke is used when no response to a packet is required to be sent back to the sender. Result Initiated is a return packet back to the original sender of a command stating that the requested action has been started. It is used, for example, when the action may take some time to accomplish. A Result Completed packet is sent to the original sender of the CAL command when the action has been accomplished. A Reject packet is sent back when the command is sent but cannot be executed by the receiving end. An Error packet is sent back when the command is sent but some error is detected in executing the command by the receiving end. The last three bits of the BF APDU are assigned by the sender and are used to track return responses when more than one Explicit Invoke command may be outstanding from that receiver back to the sender. The receiver of a packet copies this invoke ID into the APDU of the packet it sends back for any Result Initiated, Result Completed, Reject, or Error packets so the sender knows which response belongs to which original packet sent.

The next bytes of information contain the CAL command, and is known as the ASDU (Application Specific Data Unit). These usually consist of three parts, the Context, the Object, and the Method, as well as any optional arguments required by the Method. A Context is some type of functionality that may exist in an appliance, such as "Video Monitor," "Lighting Control," "Telephone," "Intercom," "Audio Source," or "Tuning System." A complete list of Contexts is contained in EIA IS-60. A byte of information is used in each CEBUS packet to indicate what context the command is intended for. The second part of the CAL command is an Object which corresponds to things one might want to control such as the power switch, the volume control, the dial on a telephone, the mute on an audio source, etc. (A list of Objects, controllable in each Context, is also contained in EIA IS-60.) Finally, the Method indicates what to do with the Object—such as "increase magnitude" or "turn OFF."

(v) Finally, Frame Check Sequence field 108 comprises an 8-bit checksum of all bits in the packet excluding the Preamble field. Its function is to determine if the packet was properly received without error. If an error does occur, there are prescribed methods of requesting a retransmission of the information.

An overview of the Consumer Electronics Bus is presented in an article entitled—*CEBUS: A New Standard in Home Automation*, written by Ken Davidson for the August/September, 1989—Issue 10 of Circuit Cellar Ink. A CEBUS standard update is available in the June/July, 1991 issue of the same publication at pages 66–73. As stated above, detailed information on the home automation standard is available in EIA IS-60.

Prior Art Telephone

Figure 6:
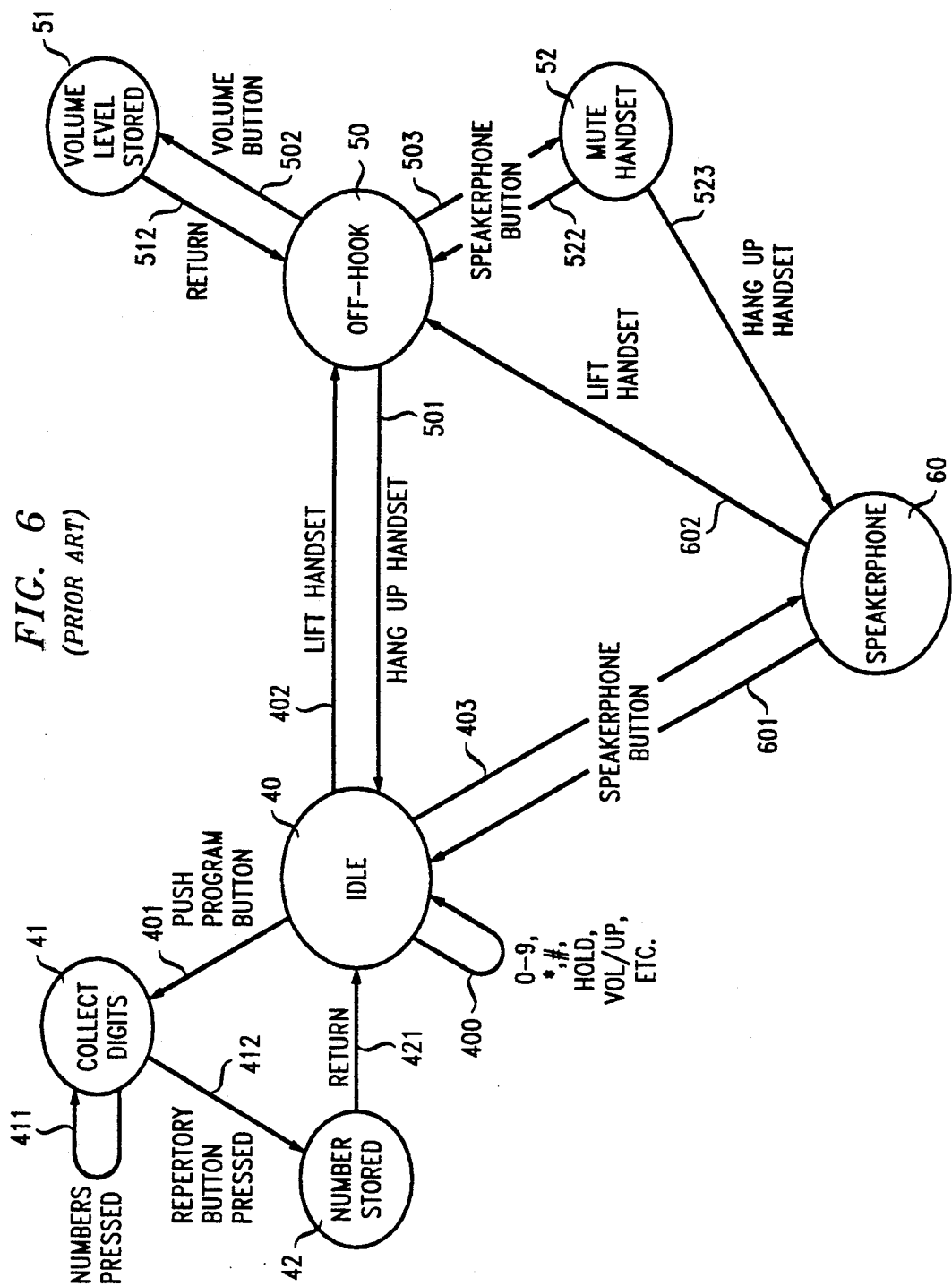
FIG. 6 discloses a state diagram of a prior art telephone set.

FIG. 6 discloses the state diagram of a prior art telephone station which may be readily converted into a flow diagram or into program steps for the necessary actions. Such program steps are stored in memory and carried out by a feature control microprocessor such as discussed above. The telephone station contemplated in FIG. 6 includes hands-free (speakerphone) operation and has three principal states designated: idle 40, off-hook 50, and speakerphone 60. State 40 represents the condition wherein the telephone station is not being actively used and the handset is positioned in its cradle. The telephone station will generate an alerting signal output in response to a ringing signal input. In the idle condition, actions including pressing a number button or the volume control button are ignored. This is indicated by step 400 which returns to the same idle state in response to these actions. From the idle state, it is possible to move into one of the active states 50, 60 by lifting the handset (step 402), or by pressing a button labeled "speakerphone" (step 403). It is also possible to program the telephone station to store different telephone numbers in its memory, by first pressing the program button (step 401). After the program button is pressed, state 41 labeled "collect digits" is entered. And in this state, all of the numbers pressed (step 411) are collected in a temporary memory area. These numbers are then transferred into a particular memory area selected by pressing the particular repertory button associated with that number (step 412). Once the repertory button is pressed (step 412) the digits stored in temporary memory are moved into a particular memory associated with the repertory button that was pressed as indicated in state 42. Upon completion of this task, step 421 indicates that the idle state is automatically returned to.

Off-hook state 50 is one of the active states in which the telephone handset is removed from its cradle. Although not shown, it is possible to dial a telephone number while in the off-hook by pressing numbers 0–9 as well as the asterisk and pound numerals. In a touch-tone telephone station, for example, depressing such numbers would cause a dual tone multi-frequency (DTMF) signal to be transmitted over the telephone line for the purpose of dialing a distant telephone station. For simplicity, this activity is not shown. In the off-hook state, it is possible to change the volume of the signal received over the telephone line. By pressing a volume control button (step 502) the volume may be increased or decreased. After the volume control button is released, the volume level is stored as indicated in state 51 and the off-hook state is immediately and automatically returned to as indicated by step 512. From the off-hook state 50, it is also possible to enter the speakerphone state 60 by depressing the speakerphone button (step 503) which causes the handset to be muted as shown by state 52, and usually indicated by a light source on the face of the telephone station. From state 52, it is possible to enter the speakerphone state 60 by hanging up the handset (step 523) or returning to the off-hook state 50 by depressing the speakerphone button (step 522) once again. Finally, once in the speakerphone state 60, it is possible to return to the idle condition by depressing the speakerphone button (step 601), or return to the off-hook state by lifting the handset once again (step 602).

Although the above description is representative of the operation of a prior art telephone station, it is understood that it does not exhaustively disclose its complete operation. Since the invention is primarily concerned with other uses that can be made of step 400 which are generally ignored in the prior art, more detail will be provided with regard to idle state 40 in connection with FIG. 7.

Telephone Set Embodiment (II)

Figure 7:
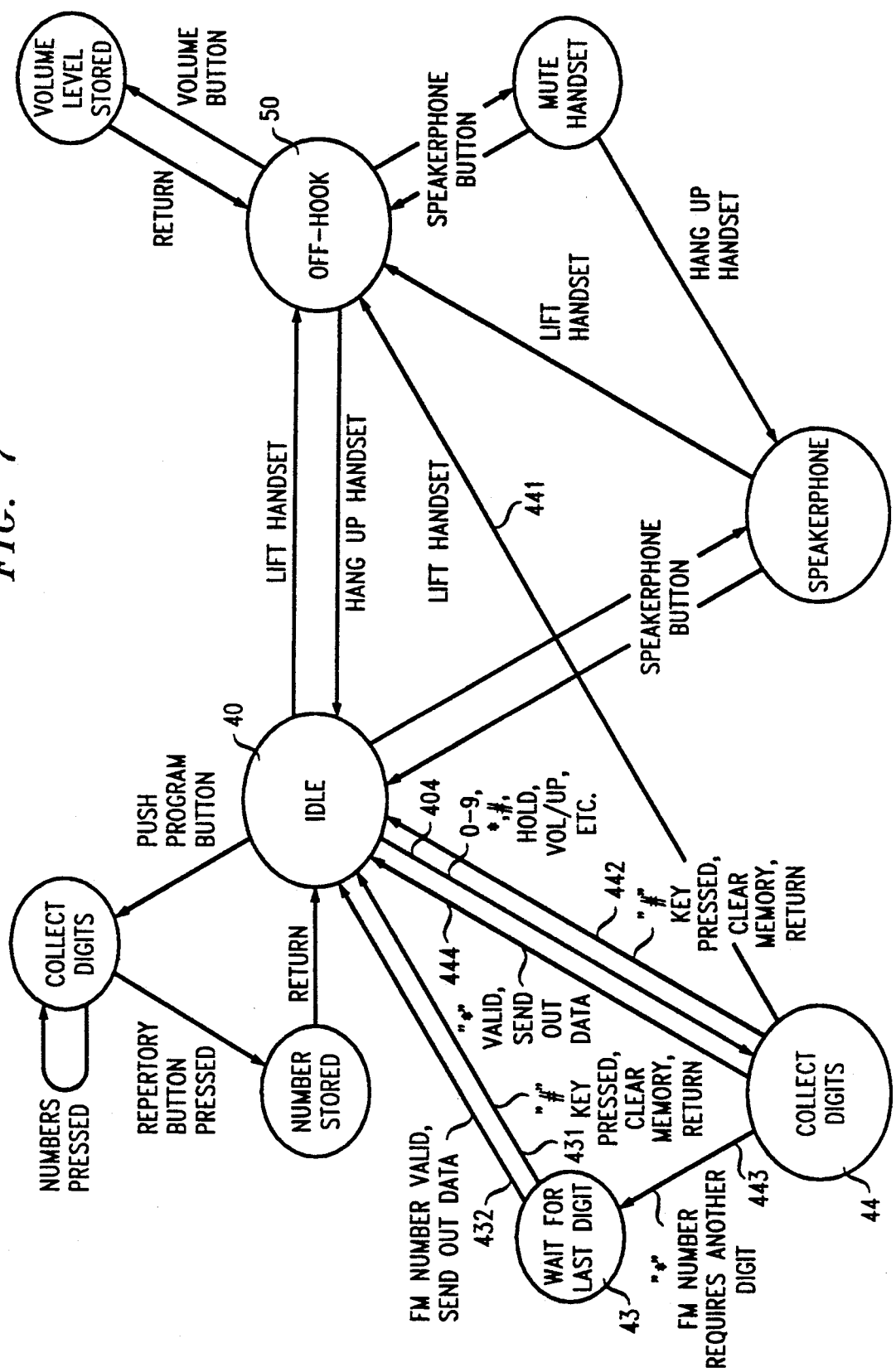
FIG. 7 discloses a state diagram of a telephone set in accordance with the invention.

Continuing with the description of the preferred embodiment of the telephone set, it is clear that by modifying the stored instructions (that run the feature control microprocessor) and adding a CEBUS transceiver, that the invention can be readily implemented in a microprocessor-controlled telephone set. FIG. 7 builds on the prior art shown in FIG. 6 by adding states 43 and 44 which replace step 400 therein. Rather than ignoring keypad switches designated 0–9, *, #, Hold, etc. when in the idle state 40, step 404 is introduced, and leads to operating state 44 which collects digits pressed at this time for the purpose of making contextual sense out of them. For example, context can be determined by examining the particular numbers entered by the user. It is noted that TV stations are numbered 2 through 83; FM radio stations are numbered 88.0 through 108.0; AM radio stations are numbered 540 through 1600; and telephone numbers are at least 7 digits long. In this illustrative embodiment, the (*) is either used to signify (i) that entry of a TV station or an AM radio station is complete, or (ii) a decimal point in the entry of an FM radio station. Accordingly, while in digit-collecting state 44, pressing the (*) will either cause state 40 or 43 to be entered depending on whether the digits entered before the (*) correspond to a known TV or AM radio station. A list of TV station numbers, AM radio station numbers, and FM radio station numbers is stored in memory and establishes a correspondence between the digits entered and the particular appliance to be addressed. If, for example, the digits collected before pressing the (*) key correspond to an AM radio station, then step 444 causes the feature control microprocessor to send that information to the CEBUS transceiver for broadcast over the power line, or other media, to the AM radio in order to select the designated station. Naturally, this requires that the AM radio be capable of understanding the broadcast information (i.e., a CEBUS radio). In the event that the user makes a mistake during entry of the digits, he may cancel the request and start over by depressing the (#) button as indicated by steps 431, 442. Although not explicitly shown in FIG. 7, the digits must be entered within a predetermined time interval or the digit-collection memory will be cleared. This protects the system against "apparent" malfunctions when keys are inadvertently pressed. Finally, should the user lift the handset (step 441) while in the digit-collecting state, telephone operation is given priority and digit collection is terminated as the telephone enters off-hook state 50.

FIG. 8 discloses an environment that supports use of the present invention wherein a number of electrical appliances are connected to AC power line 850 and, hence, to each other. FIG. 7 discussed the situation in which a telephone set 10 was be used to control an FM radio 801 or television set 803. The telephone set can also be used to control other appliances in the same or other rooms. Within each room shown in FIG. 8, any appliance having control switches can be use to control any other appliance when actuation of its control switches has no meaning insofar as its associated appliance. Remote controller 800 is associated with television set 803, and its commands would first apply to that television set. However, if television set 803 was already on when an "on" command is transmitted by controller 800, then lamp 804 or FM radio 801 might be turned on—depending on the application program stored in controller 800. Similarly, controller 810, which resides in a different room and is associated with television set 813, might cause lamp 814 to be turned on when the "on" command made no sense to television set 814. Furthermore, a second operation of the "on" switch of controller 810 might then be used to control lamp 804 in a different room because all appliances were already on in its primary group. Appliances may be grouped in any manner that the customer finds useful. An example of grouping is discussed in connection with center-rest light switches 900, 910 that are normally associated with lamps 804, 814 respectively.

Figure 9:
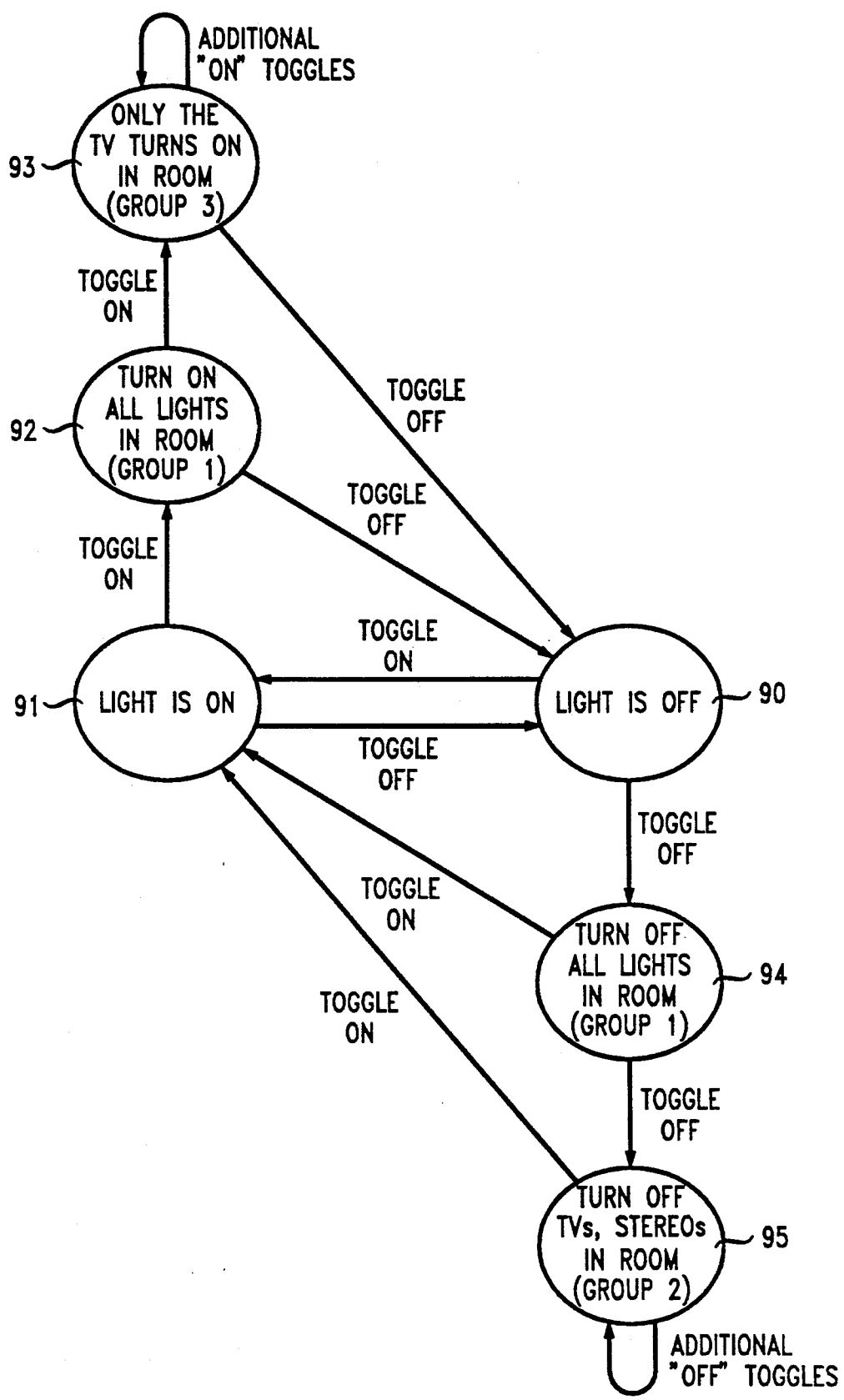
FIG. 9 discloses a state diagram of a center-rest switch in accordance with the invention.

FIG. 9 is a state diagram which discloses operation of a center-rest light switch in accordance with the invention. The light switch includes a microprocessor and application software (stored instructions) that respond to switch operations for the purpose of either controlling the associated light or another appliance in the same room. In this example, it is assumed that there are several lights in the same room, one of which is primarily associated with this particular switch. All lights in the room, other that the associated light are designated "Group 1." Although grouping is beyond the scope of the invention, the center rest switch may include a "program" button which, when pressed the first time, remembers the address of any appliance that is subsequently connected to an AC power outlet. (Upon connection, CEBUS appliances perform a known start-up routine which includes transmitting their address and house code (see FIG. 5)). Similarly, if the "program" button is pressed twice, all appliances that are subsequently connected are assigned to Group 2. As shown in FIG. 9, both the TV and stereo are members of Group 2, whereas only the TV is in Group 3. An appliance can, therefore, be part of one or more Groups in accordance with user preference.

Operating state 90 corresponds to the condition that the light, associated with the center-rest switch, is OFF. Toggling the light switch "on" causes the associated light to turn ON and state 91 to be entered. Toggling the light switch "on" again causes all of the appliances in Group 1 to turn ON and state 92 to be entered. Toggling the light switch "on" yet another time causes all of the appliances in Group 3 to turn ON and operating state 93 to be entered. Additional "on" toggles have no further effect in the example of FIG. 9. It now appears that all appliances are ON and controlled by the center-rest light switch. The present invention is best understood by what happens in operating state 93 when the switch is toggled "off". Instead of retracting the operating states encountered in reaching state 93, whenever the associated light is ON, then toggling the switch "off" causes it to turn OFF because the "off" command makes sense in the context of the present state of the light. According to the example, we are now in operating state 90 and any additional "off" toggles of the center-rest switch would be out-of-context with the existing state of the light. Therefore, subsequent "off" toggles cause other appliances to be turned OFF because the user apparently wanted something turned off that was presently on. Accordingly, state 94 and then state 95 are entered. The particular application program that responds to the toggling commands need not operate in the particular manner disclosed in FIG. 9. The designer is free to imbue his light switch with any "personality" that would make his product desirable. What is important in the present invention is that when the toggling command is out-of-context with the present state of the associated appliance, that a signal is generated for transmission to another appliance so that it will perform a similar task. It is understood that a center-rest switch includes any switch that allows multiple, sequential "on" commands without an intervening "off" command; or multiple, sequential "off" commands without an intervening "on" command.

Although various particular embodiments of the invention have been shown and described, it is understood that modifications are possible within the spirit and scope of the invention. These modifications include, but are not limited to, the use of a transmission media other than the AC power line and the use of a protocol other than the CEBUS standard.

We claim:

1. First electrical apparatus, for connection to a transmission media, having one operating state in which it responds to a primary control signal by performing a predetermined task, and having another operating state in which the primary control signal is out-of-context, characterized by:
   means for performing the predetermined task if the first electrical apparatus is in its one operating state when the primary control signal is received;
   means for generating a secondary control signal, suitable for transmission over the transmission media to a second electrical apparatus, if the first electrical apparatus is in its other operating state when the primary control signal is received; and
   means interconnecting the secondary control signal to the transmission media.

2. The first electrical apparatus of claim 1 further including a controller associated therewith, said controller having one or more switches which, when actuated, generate the primary control signal.

3. The first electrical apparatus of claim 1 wherein the means for generating the secondary control signal includes a microprocessor that executes instructions stored in a memory in response to the primary control signal, the secondary control signal including an information packet that requests the second electrical apparatus to perform a task that is contextually similar to the predetermined task.

4. The first electrical apparatus of claim 3 wherein the means for generating the secondary control signal includes modulating means for adapting the primary control signal for transmission over the transmission media.

5. The electrical apparatus of claim 4 wherein the transmission media comprises an AC power line.

6. The electrical apparatus of claim 5 wherein the modulating means generates spread spectrum signals.

7. The first electrical apparatus of claim 1 wherein the first electrical apparatus comprises a light having a center-rest control switch.

8. A home automation system for controlling, from a single control unit, at least two electrical appliances having contextually similar operating states such as on/off, the control unit being associated with the first appliance and including means for generating a command signal which is executable by the first appliance in its first operating state but which is inappropriate in its second operating state, the control unit being effectively connected to the first and second electrical appliances via a common transmission media, but remotely located therefrom, the first electrical appliance including:
means for determining whether it is in the first operating state or in the second operating state;
means for executing the command signal when said first appliance is in its first operating state when the command signal is received; and
means responsive to the command signal for forwarding same over the transmission media to the second appliance if the first appliance is in its second operating state when the command signal is received.

9. The home automation system of claim 8 wherein the transmission media comprises an AC power line.

10. The home automation system of claim 9 wherein the first appliance comprises a light and the control unit comprises a center-rest switch.

11. A telephone set for interconnection with a transmission media, the telephone set having an active state, an idle state, and including a plurality of manually operated keys for dialing a telephone number when the telephone set is in the active state
characterized by:
means responsive to the operation of the keys, when the telephone set is in the idle state for generating a control signal to be transmitted to an electrical appliance other than said telephone set which is connected to the transmission media, said control signal including information regarding the key pressed; and
interface means coupling the control signal from the telephone set to the transmission media.

12. The telephone set of claim 11 wherein the interface means includes means for modulating the information signal to be coupled to the transmission media.

13. The telephone set of claim 12 wherein the transmission media comprises an AC power line.

14. The telephone set of claim 13 wherein the modulating technique corresponds to an EIA standard for data communication over a power line.

15. A method for controlling, from a single controller, at least first and second electrical appliances, each having first and second contextually similar operating states such as on/off, the controller being associated with the first appliance and including means for generating a command signal which is executable by the first appliance in its first operating state but which is inappropriate in its second operating state, the controller being effectively connected to the first and second electrical appliances via a common transmission media, the method including the steps of:

transmitting the command signal over the transmission media to the first electrical appliance in response to actuations of switches located on the controller;
determining the operating state of the first appliance;
executing the command at the first appliance if it is determined that the first appliance is in its first operating state when the command signal is received; and
transmitting the command signal over the transmission media to the second appliance if it is determined that the first appliance is in its second operating state when the command signal is received.

* * * * *